(12) United States Patent
Duperray et al.

(10) Patent No.: US 11,713,147 B2
(45) Date of Patent: Aug. 1, 2023

(54) ARTICLE PICKING AND TREATING APPARATUS

(71) Applicant: Anheuser-Busch InBev S.A., Brussels (BE)

(72) Inventors: Philippe Jean Marie Duperray, Châteauroux (FR); Wim Dekocker, Leuven (BE)

(73) Assignee: Anheuser-Busch InBev S.A., Brussels (BE)

( * ) Notice: Subject to any disclaimer, the term of this patent is extended or adjusted under 35 U.S.C. 154(b) by 0 days.

(21) Appl. No.: 17/631,356

(22) PCT Filed: Jul. 30, 2020

(86) PCT No.: PCT/EP2020/071601
§ 371 (c)(1),
(2) Date: Jan. 28, 2022

(87) PCT Pub. No.: WO2021/019053
PCT Pub. Date: Feb. 4, 2021

(65) Prior Publication Data
US 2022/0324599 A1    Oct. 13, 2022

(30) Foreign Application Priority Data

Jul. 30, 2019 (EP) .................................... 19189056
Dec. 27, 2019 (EP) .................................... 19219880

(51) Int. Cl.
*B65B 21/18* (2006.01)
*B65B 21/06* (2006.01)
(Continued)

(52) U.S. Cl.
CPC ............ *B65B 39/007* (2013.01); *B65B 21/06* (2013.01); *B65B 21/20* (2013.01); *B65G 47/53* (2013.01);
(Continued)

(58) Field of Classification Search
CPC ......... B65B 21/06; B65B 21/18; B65B 21/20; B65B 35/36; B65B 39/007; B65G 47/53; B65G 47/841
(Continued)

(56) References Cited

U.S. PATENT DOCUMENTS 2,358,292 A  9/1944 Malhiot
3,555,776 A  1/1971 Nigrelli et al.
(Continued)

FOREIGN PATENT DOCUMENTS

BE     1027586 B1    4/2021
BR  PI0923133 B1    6/2019
(Continued)

OTHER PUBLICATIONS

International Preliminary Report on Patentability for Application No. PCT/EP2020/071601 dated Feb. 10, 2022 (7 pages).
(Continued)

*Primary Examiner* — Douglas A Hess
(74) *Attorney, Agent, or Firm* — Michael Best & Friedrich LLP

(57) ABSTRACT

Article picking and treating apparatus The present invention provides an apparatus for picking and treating articles simultaneously, said picking and treating each being operated at a first and a second conveying line.

15 Claims, 10 Drawing Sheets

(51) Int. Cl.
  *B65B 21/20* (2006.01)
  *B65B 35/36* (2006.01)
  *B65G 47/53* (2006.01)
  *B65B 39/00* (2006.01)
  *B65G 47/84* (2006.01)

(52) U.S. Cl.
  CPC .... *B65G 47/841* (2013.01); *B65G 2201/0244* (2013.01)

(58) Field of Classification Search
  USPC ................. 198/469.1, 470.1, 474.1
  See application file for complete search history.

(56) References Cited

U.S. PATENT DOCUMENTS

| | | |
|---|---|---|
| 3,601,246 A | 8/1971 | Dubois |
| 3,815,320 A | 6/1974 | Ganz |
| 4,191,003 A | 3/1980 | Talarico |
| 4,641,742 A | 2/1987 | Igarashi et al. |
| 5,011,126 A | 4/1991 | Suzuki et al. |
| 5,237,468 A | 8/1993 | Ellis |
| 5,261,520 A | 11/1993 | Duke |
| 5,388,389 A | 2/1995 | Tisma |
| 5,558,200 A | 9/1996 | Whitby et al. |
| 5,607,045 A | 3/1997 | Hermann Kronseder |
| 6,191,507 B1 | 2/2001 | Peltier et al. |
| 6,201,203 B1 | 3/2001 | Tilles |
| 6,209,710 B1 | 4/2001 | Mueller et al. |
| 6,421,984 B1 | 7/2002 | Murgatroyd et al. |
| 6,467,608 B2 | 10/2002 | Stauber |
| 6,733,224 B1 | 5/2004 | Linner |
| 6,811,019 B2 | 11/2004 | Christian et al. |
| 6,848,566 B2 | 2/2005 | Harnish et al. |
| 6,868,652 B2 | 3/2005 | Arends et al. |
| 6,876,107 B2 | 4/2005 | Jacobs |
| 6,904,733 B2 | 6/2005 | Boix Jaen |
| 7,093,408 B2 | 8/2006 | Duperray et al. |
| 7,134,258 B2 | 11/2006 | Kalany et al. |
| 7,146,784 B1 | 12/2006 | Portrait |
| 7,153,085 B2 | 12/2006 | Clark et al. |
| 7,309,203 B2 | 12/2007 | Clark et al. |
| 7,310,925 B2 | 12/2007 | Monti |
| 7,320,203 B2 | 1/2008 | Monti |
| 7,392,630 B2 | 7/2008 | Ford |
| 7,401,451 B2 | 7/2008 | Bennett |
| 7,401,453 B2 | 7/2008 | Ford |
| 7,461,838 B2 | 12/2008 | Hendricks et al. |
| 7,543,424 B2 | 6/2009 | Lechner et al. |
| 7,543,425 B2 | 6/2009 | Monti |
| 7,549,276 B2 | 6/2009 | Monti |
| 7,552,570 B2 | 6/2009 | Raudat et al. |
| 7,631,474 B2 | 12/2009 | Ford |
| 7,735,296 B2 | 6/2010 | Momich |
| 7,779,606 B2 | 8/2010 | Ford |
| 7,789,219 B2 | 9/2010 | Baldanza et al. |
| 7,803,099 B2 | 9/2010 | Biraud et al. |
| 7,806,250 B2 | 10/2010 | Ford |
| 8,033,082 B2 | 10/2011 | Raudat et al. |
| 8,096,409 B2 | 1/2012 | Wipf et al. |
| 8,322,514 B2 | 12/2012 | Bonnain et al. |
| 8,430,232 B2 | 4/2013 | Baldanza et al. |
| 8,448,777 B2 | 5/2013 | Pazdernik |
| 8,534,727 B2 | 9/2013 | Weclawski et al. |
| 8,671,651 B2 | 3/2014 | Poutot |
| 8,776,985 B2 | 7/2014 | Huettner et al. |
| 8,777,552 B2 | 7/2014 | Ward et al. |
| 8,876,182 B2 | 11/2014 | Eidelberg et al. |
| 8,903,540 B2 | 12/2014 | Stork et al. |
| 9,045,291 B2 | 6/2015 | Konrad et al. |
| 9,061,838 B2 | 6/2015 | Van De et al. |
| 9,199,757 B2 | 12/2015 | Kolb |
| 9,233,800 B2 | 1/2016 | Senn et al. |
| 9,309,016 B2 | 4/2016 | Stork et al. |
| 9,365,366 B2 | 6/2016 | Girtman |
| 9,403,611 B2 | 8/2016 | Sacchetti et al. |
| 9,533,785 B2 | 1/2017 | Rapp et al. |
| 9,540,127 B2 | 1/2017 | Papsdorf et al. |
| 9,546,049 B2 | 1/2017 | Lindauer |
| 9,573,771 B2 | 2/2017 | Papsdorf et al. |
| 9,580,253 B2 | 2/2017 | Papsdorf et al. |
| 9,604,792 B2 | 3/2017 | Wipf |
| 9,611,102 B2 | 4/2017 | Job et al. |
| 9,725,197 B2 | 8/2017 | Pettersson et al. |
| 9,731,854 B2 | 8/2017 | Mann et al. |
| 9,796,495 B2 | 10/2017 | Boden et al. |
| 9,802,507 B2 | 10/2017 | Clark et al. |
| 9,809,392 B2 | 11/2017 | Walter et al. |
| 9,856,092 B2 | 1/2018 | Job et al. |
| 9,873,571 B2 | 1/2018 | Hahn |
| 9,938,031 B2 | 4/2018 | Shurtleff et al. |
| 9,950,875 B2 | 4/2018 | Walter et al. |
| 9,957,072 B2 | 5/2018 | Shurtleff et al. |
| 9,963,258 B2 | 5/2018 | Rapp et al. |
| 9,988,166 B2 | 6/2018 | Avril et al. |
| 9,995,691 B2 * | 6/2018 | Piana ................. G01N 21/9009 |
| 10,029,855 B2 | 7/2018 | Grosskreuz et al. |
| 10,106,331 B2 | 10/2018 | Radak et al. |
| 10,139,351 B2 | 11/2018 | Piana et al. |
| 10,150,219 B2 | 12/2018 | Ridel et al. |
| 10,161,970 B2 | 12/2018 | Sun et al. |
| 10,246,266 B2 | 4/2019 | Weber et al. |
| 10,287,105 B2 | 5/2019 | Hayashi et al. |
| 10,407,195 B2 | 9/2019 | Sassi et al. |
| 10,486,914 B2 | 11/2019 | Choplin |
| 10,604,291 B2 | 3/2020 | Hutter et al. |
| 10,669,049 B2 | 6/2020 | Eberhardt et al. |
| 10,696,488 B2 | 6/2020 | Papsdorf et al. |
| 10,717,606 B2 | 7/2020 | Papsdorf et al. |
| 10,766,650 B2 | 9/2020 | Choplin et al. |
| 10,773,847 B2 | 9/2020 | Bellante |
| 10,829,255 B2 | 11/2020 | Aumann et al. |
| 10,850,881 B2 | 12/2020 | Langen et al. |
| 10,882,704 B2 | 1/2021 | Torrero |
| 10,919,705 B2 | 2/2021 | Papsdorf et al. |
| 11,001,400 B2 | 5/2021 | Kalany et al. |
| 11,279,511 B2 * | 3/2022 | Marcantoni ............... B65C 9/04 |
| 11,498,772 B2 * | 11/2022 | Beyer ................... B65G 47/53 |
| 2001/0019006 A1 | 9/2001 | Stauber |
| 2003/0015402 A1 | 1/2003 | Bennett |
| 2003/0230941 A1 | 12/2003 | Jacobs |
| 2004/0262127 A1 | 12/2004 | Harnish et al. |
| 2005/0220582 A1 | 10/2005 | Kumagai et al. |
| 2006/0207220 A1 | 9/2006 | Ford |
| 2007/0119123 A1 | 5/2007 | Clark et al. |
| 2007/0152458 A1 | 7/2007 | Guidetti |
| 2008/0000756 A1 | 1/2008 | Behnke et al. |
| 2008/0196362 A1 | 8/2008 | Monti |
| 2008/0283361 A1 | 11/2008 | Martini et al. |
| 2009/0229227 A1 | 9/2009 | Raudat et al. |
| 2010/0084247 A1 | 4/2010 | Wipf et al. |
| 2010/0140052 A1 | 6/2010 | Martini |
| 2010/0192515 A1 | 8/2010 | Chalendar et al. |
| 2011/0150610 A1 | 6/2011 | Weber |
| 2011/0154784 A1 | 6/2011 | Poutot |
| 2011/0173930 A1 | 7/2011 | Poutot |
| 2012/0085623 A1 | 4/2012 | Wipf |
| 2012/0261233 A1 | 10/2012 | Huettner et al. |
| 2014/0262685 A1 | 9/2014 | Job et al. |
| 2014/0299445 A1 | 10/2014 | Kolb |
| 2014/0377049 A1 | 12/2014 | Girtman |
| 2015/0001041 A1 | 1/2015 | Barber et al. |
| 2015/0063963 A1 | 3/2015 | Kinugawa |
| 2015/0139772 A1 | 5/2015 | Rapp et al. |
| 2015/0158611 A1 | 6/2015 | Kalany et al. |
| 2015/0321857 A1 | 11/2015 | Sacchetti et al. |
| 2016/0068290 A1 | 3/2016 | Bonnain et al. |
| 2016/0107782 A1 | 4/2016 | Hutter et al. |
| 2018/0186579 A1 | 7/2018 | Choplin |
| 2018/0222608 A1 | 8/2018 | Hutter et al. |
| 2019/0233151 A1 | 8/2019 | Ford et al. |
| 2019/0255698 A1 | 8/2019 | Zeiner et al. |
| 2020/0189779 A1 | 6/2020 | Canalicchio et al. |

(56) References Cited

U.S. PATENT DOCUMENTS

| | | | |
|---|---|---|---|
| 2020/0290815 A1 | 9/2020 | Papsdorf et al. | |
| 2020/0290816 A1 | 9/2020 | Papsdorf et al. | |
| 2021/0139176 A1 | 5/2021 | Bonnain | |

FOREIGN PATENT DOCUMENTS

| | | |
|---|---|---|
| CN | 202729327 U | 2/2013 |
| CN | 108674883 A | 10/2018 |
| CN | 208216241 U | 12/2018 |
| CN | 108454224 B | 6/2020 |
| DE | 1236531 B | 3/1967 |
| DE | 3709046 C1 | 10/1988 |
| DE | 4208818 A1 | 9/1993 |
| DE | 19602358 C1 | 3/1997 |
| DE | 19628563 A1 | 1/1998 |
| DE | 10121038 A1 | 10/2002 |
| DE | 10346415 A1 | 5/2005 |
| DE | 202005006755 U1 | 10/2005 |
| DE | 102004026455 A1 | 12/2005 |
| DE | 102005014863 A1 | 10/2006 |
| DE | 202010001712 U1 | 6/2011 |
| DE | 102011076864 A1 | 12/2012 |
| DE | 102011015741 B4 | 1/2013 |
| DE | 102011081705 A1 | 2/2013 |
| DE | 102011085724 A1 | 5/2013 |
| DE | 102014105998 A1 | 2/2015 |
| DE | 102014103632 A1 | 9/2015 |
| DE | 102015203412 A1 | 9/2015 |
| DE | 102015114654 A1 | 3/2017 |
| DE | 102016212227 A1 | 1/2018 |
| DE | 102016212237 A1 | 1/2018 |
| DE | 102016121361 A1 | 5/2018 |
| DE | 202018103487 U1 | 8/2018 |
| DE | 102016105570 B4 | 1/2019 |
| DE | 102019107313 A1 | 9/2020 |
| DE | 102020107427 A1 | 9/2020 |
| DE | 102019204393 A1 | 10/2020 |
| EP | 0439741 A1 | 8/1991 |
| EP | 0496046 B1 | 1/1995 |
| EP | 0813494 B1 | 9/1999 |
| EP | 1231145 A1 | 8/2002 |
| EP | 1123886 B1 | 8/2004 |
| EP | 1522402 B1 | 6/2006 |
| EP | 1327591 B1 | 11/2006 |
| EP | 1790593 A1 | 5/2007 |
| EP | 1067048 B1 | 8/2008 |
| EP | 2014559 A1 | 1/2009 |
| EP | 1645340 B1 | 10/2010 |
| EP | 2192063 B1 | 4/2012 |
| EP | 2757043 A1 | 7/2014 |
| EP | 2673224 B1 | 1/2015 |
| EP | 2560904 B1 | 4/2015 |
| EP | 2484611 B1 | 9/2015 |
| EP | 2500296 B1 | 2/2016 |
| EP | 2634100 B1 | 2/2016 |
| EP | 2921433 B1 | 9/2016 |
| EP | 3034415 B1 | 3/2017 |
| EP | 3034441 B1 | 4/2017 |
| EP | 3024737 B1 | 7/2017 |
| EP | 2980010 B1 | 8/2017 |
| EP | 2861496 B1 | 9/2017 |
| EP | 3022138 B1 | 10/2017 |
| EP | 3038959 B1 | 11/2017 |
| EP | 2848382 B1 | 12/2017 |
| EP | 2736834 B1 | 2/2018 |
| EP | 3003927 B1 | 3/2018 |
| EP | 3266718 B1 | 7/2018 |
| EP | 3109998 B1 | 8/2019 |
| EP | 3363751 B1 | 4/2020 |
| EP | 3659932 A2 | 6/2020 |
| EP | 3251986 B1 | 1/2021 |
| EP | 3230181 B2 | 7/2021 |
| EP | 3422562 B1 | 10/2021 |
| FR | 3088842 A1 | 5/2020 |
| GB | 1340427 A | 12/1973 |
| GB | 2434356 A | 7/2007 |
| IT | BO990370 A1 | 1/2001 |
| IT | BO990484 A1 | 3/2001 |
| JP | S54128282 U | 9/1979 |
| JP | S6277149 U | 5/1987 |
| JP | H05254644 A | 10/1993 |
| JP | 2011025392 A | 2/2011 |
| JP | 2018184294 A | 11/2018 |
| WO | WO99036317 A2 | 7/1999 |
| WO | WO00068087 A2 | 11/2000 |
| WO | WO01085581 A1 | 11/2001 |
| WO | WO2004024401 A1 | 3/2004 |
| WO | WO2005070768 A1 | 8/2005 |
| WO | WO2006098556 A1 | 9/2006 |
| WO | WO2007033267 A2 | 3/2007 |
| WO | WO2008036754 A2 | 3/2008 |
| WO | WO2010120869 A1 | 10/2010 |
| WO | WO2011127367 A1 | 10/2011 |
| WO | WO2011138448 A1 | 11/2011 |
| WO | WO2012057996 A2 | 5/2012 |
| WO | WO2013005120 A1 | 1/2013 |
| WO | WO2013185954 A1 | 12/2013 |
| WO | WO2014072518 A2 | 5/2014 |
| WO | WO2014118631 A1 | 8/2014 |
| WO | WO2014187543 A1 | 11/2014 |
| WO | WO2015101862 A1 | 7/2015 |
| WO | WO2016012158 A1 | 1/2016 |
| WO | WO2016012159 A1 | 1/2016 |
| WO | WO2016069190 A1 | 5/2016 |
| WO | WO2016069457 A1 | 5/2016 |
| WO | WO2016146213 A1 | 9/2016 |
| WO | WO2016188843 A1 | 12/2016 |
| WO | WO2016200753 A1 | 12/2016 |
| WO | WO2017167421 A1 | 10/2017 |
| WO | WO2018049125 A1 | 3/2018 |
| WO | WO2018144552 A1 | 8/2018 |
| WO | WO2018145214 A1 | 8/2018 |
| WO | WO2018161160 A1 | 9/2018 |
| WO | WO2018193218 A1 | 10/2018 |
| WO | WO2019007923 A1 | 1/2019 |
| WO | WO2019129968 A1 | 7/2019 |
| WO | WO2020126218 A1 | 6/2020 |
| WO | WO2020146486 A1 | 7/2020 |
| WO | WO2020244951 A1 | 12/2020 |
| WO | WO 2021/019012 A1 * 4/2021 ............. B65B 21/18 |  |

OTHER PUBLICATIONS

ABB Robotics, "Picking and packing salami snacks," <https://www.youtube.com/watch?v=aPTd8XDZOEk> YouTube publication date Apr. 19, 2010.

All Packaging Company, "Folding Carton continuous printing at up to 20k sheets per hour," <https://www.youtube.com/watch?v=Bc8ZnHukvN0> YouTube publication date Mar. 3, 2013.

Bastian Solutions, "High-Speed Pick & Place Robots by Basitan Solutions," <https://www.youtube.com/watch?v=6RKXVefE98w> YouTube publication date Apr. 3, 2012.

BluePrint Automation, "20237 BluePrint Automation (BPA) Robotic Pick & Place Case Packer (Model: Robotic Top Loader," <https://www.youtube.com/watch?v=RjxTeuyaH_Q> YouTube publication date Apr. 13, 2012.

BOBST, "BOBST Ambition folder-gluers," <https://www.youtube.com/watch?v=EvLkFkz-Uv0> YouTube publication date Jan. 29, 2015.

Packagingspace, "Cama Group complete packaging lineup.mpg," <https://www.youtube.com/watch?v=6uTnz59b4H8> YouTube publication date May 16, 2011.

Packfeeder, "Robotic bottle unscrambler—Pickfeeder Twin 200," <https://www.youtube.com/watch?v=ueiOqVip7-c> YouTube publication date Dec. 11, 2018.

Professional Packaging Systems, "A-B-C 450 High Speed Case Erector and Bottom Sealer / ProPac.com," <https://www.youtube.com/watch?v=w6w9psSstKA> YouTube publication date Sep. 3, 2010.

STAX Technologies, "Case packer + palletizer," <https://www.youtube.com/watch?v=YtNft4FYkDw> YouTube publication date May 6, 2015.

(56) References Cited

OTHER PUBLICATIONS

International Search Report and Written Opinion for Application No. PCT/EP2020/071601 dated Oct. 30, 2020 (9 pages).

\* cited by examiner

ARTICLE PICKING AND TREATING APPARATUS

CROSS REFERENCE TO RELATED APPLICATIONS

This application is a national stage filing under 35 U.S.C. § 371 of International Patent Application No.: PCT/EP2020/071601, filed Jul. 30, 2020, which claims priority to European Patent Application No. 19189056.5, filed Jul. 30, 2019, and European Patent Application No. 19219880.2, filed Dec. 27, 2019, the entire contents of which all are hereby incorporated by reference herein.

TECHNICAL FIELD

The present invention generally relates to an article picking and treating apparatus.

BACKGROUND

In the recent years, there has been a many-fold increase in the trend of grouping large number of articles or items such as food items, including liquid foods, home essentials, stationary items, beverage containers, and the like, in the form of secondary packages, for various purposes such as to enable bulk selling, easy transportation, handling, and the like.

Generally, the packaging of one or more articles in so-called secondary packages involves multiple steps including receiving a supply of such articles from one or more in-feeds, picking up and dropping these in the packages and then closing the packages.

Numerous attempts have been made to develop improved systems for increased speed and accuracy.

Conventionally, moving items from an article feed conveyor into open receptacles, such as for example cardboard boxes, is achieved by means of effectors and/or manipulators, which may also take the form of robots or automatons. One such robotic arm is disclosed in U.S. Pat. No. 5,060,455 ("Robotic Case Packaging System and Method"), the contents of which are hereby incorporated by reference. Further, some high-speed robotic arms as one disclosed in U.S. Pat. No. 4,976,582 are also utilized.

However, such conventional robotic transfer mechanisms are often not able to accommodate high speed handling because of the use of multiple feed lines, one supplying articles and the other supplying open packages.

Various other transfer mechanisms have been developed for picking up articles from the infeed-line and depositing them within the packages at a second conveying line. For example, DE19731656C1 discloses a device, that can automatically transfer articles from a first conveyor to a second conveyor, in order to organize or distribute individual packages.

German patent no. 4204993 discloses a mechanism for supplying containers to a continuously operating packaging machine. The mechanism includes a plurality of gripping heads which are hinged at one lever, respectively, while being rotationally driven. In addition, the patent discloses the use of an additional conveyor belt for guiding the articles towards the direction of the respective gripping heads. Bottles are arranged in rows, stopped at one end of the conveyor belt by a stop, and accepted by one of the gripping heads. Once they have been accepted, the stop is lowered. Further bottles having moved up in the meantime and can be accepted by another gripping head and dropped into another following crate.

However, such conventionally known transfer systems have several shortcomings, for example, these mechanisms generally require the packaging cartons to be held generally stationary while the packages are being inserted therein and therefore are subjected to intermittent motion in connection with the carton filling operation. Particularly this intermittent motion requires rapidly accelerating and/or decelerating these supplies of articles as well as packages which in turn may cause collision of the articles against each other and in some instances within the packages which receive them.

To overcome the above problem, this transfer mechanism must be able to manage a "pitch" adjustment between individual articles or article groupings and/or packages. Pitch is generally defined as a central distance between two consecutive items, whatever the items are. Currently, this pitch is set and monitored by multi-axes robots capable of line-tracking the articles, items or (box-shaped) packages. The loading follows a pre-determined grouping of articles to be packed, corresponding to a certain number of units of articles or products per package (e.g., box). Further, some variable-pitch pick and place devices have been developed, such as the device disclosed in U.S. Pat. No. 5,290,134, to provide the capability of simultaneous pick-up and deposit even where the pitch of one feed may differ from that of another feed. However, such in-line tracking and variable pick-up mechanisms adjustment requires a lot of calculations and analysis, and within a constant changing environment, it is a considerable challenge.

Additionally, the currently known transfer systems are accommodated to transfer a predetermined group of articles having a shape, configuration, size, or number of articles in a fixed size package. If however, there is a need to switch to a different configuration, package shape, package size or other, these robotic arms and other currently known machines require a manual adjustment. Such manual change-over period impacts productivity and is an expensive delay in any Plant.

Accordingly, as can be understood from the foregoing discussion, none of the existing solutions completely provide the flexibility of using a same packaging machine to handle varying configurations, shapes and pitches during an intermittent and/or continuous packaging operation of various kind of articles within a package. Thus, in the context of the above, an improved article picking and treating apparatus is desired, which while being cost effective and easy to implement allows to carry out packaging even with varying pitches, shapes, sizes, arrangements, and the like without needing interchanging elements and components.

SUMMARY

In one aspect of the invention, a article picking and treating apparatus for picking up a set of articles from a first conveying line and releasing into a package at a second conveying line is provided. The article picking and treating apparatus includes a pair of closed loop conveying tracks having one or more pairs of vertically movable modular track portions. The apparatus further includes a plurality of support means configured generally transversally to the pair of closed loop tracks, each extending between and movably connected to the pair of closed loop tracks at its opposite ends, through a support movement mechanism. The article picking and treating apparatus further includes a plurality of gripper sets movingly supported onto the plurality of support means.

The apparatus is adapted such that, in operation, horizontal movement of the plurality of support means across the pair of closed loop conveying tracks and a vertically upward and/or downward movement of the one or more pairs of modular track portions are synchronized in such a way that one or more of the gripper sets is adapted to selectively pick up a set of articles from a first location while one or more of the gripper sets selectively treats a set of already picked articles at a second location. It should be understood that each vertically moveable modular track portion is a portion of a respective closed loop conveying track, and that each pair of said vertically moveable modular track portions includes a first modular track portion being part of a first track of said pair of closed loop conveying tracks and a second modular track portion being part of the second track of said pair of closed loop conveying tracks.

The horizontal movement of the plurality of support means across the pair of closed loop conveying tracks and a vertically upward and/or downward movement of the one or more pairs of modular track portions are synchronized in such a way that when one or more support means supporting one or more gripper sets is located on a pair of vertically moveable modular track portions, upward and/or downward movement of these track portions is performed in order to selectively pick up a set of articles from a first location while one or more of the gripper sets of another support means selectively treats a set of already picked articles at a second location. Alternatively, synchronization may be in such a way that when one or more support means is located on a pair of vertically moveable modular track portions, upward and/or downward movement of these track portions is performed in order to selectively treat a set of already picked articles at a second location while one or more of the gripper sets of another support means selectively picks up a set of articles at a first location.

The apparatus may adapted such that in operation, when one or more support means supporting one or more gripper sets is located on a first pair of vertically moveable modular track portions and one or more support means is located on the second pair, upward and/or downward movement of the two pairs or two sets of track portions is performed in order to selectively pick up a set of articles from a first location while one or more of the gripper sets of the other support means selectively treats and/or discharge a set of already picked articles at a second location.

The horizontal movement may include recirculating and/or reciprocating and/or bi-directional movement of the plurality of support means.

Preferably, the apparatus has two pairs of vertically moveably modular track portions, such that when one support means supporting one or more gripper sets is located on a first pair of vertically moveable modular track portions and a second support means is located on the second pair, upward and/or downward movement of these two pairs of track portions is performed in order to selectively pick up a set of articles from a first location while one or more of the gripper sets of another support means selectively treats a set of already picked articles at a second location.

Preferably, the parallel closed loop conveying tracks may be independent motion controlled, or the plurality of gripper sets may be movingly configured in an independent motion controlled fashion, and more preferably both the conveying tracks and the gripper sets are independent motion controlled. In the context of the present invention, articles may be of any type, food or non-food.

In the context of the present invention, treating articles may include performing any type of action on the articles, such as packing, orienting, mounting, fixing, gluing, welding, printing, labeling, surface treating, inspecting etc., and combinations thereof. More specifically in the beverage industry, treating may in addition also comprise closing beverage containers, for example by gripping crowns at a first location, while closing beverage containers at a second location with already picked up crowns.

In the context of the present invention a gripper head is generally adapted to pick up an article. It may be further adapted to perform any treatment, i.e. any type of action, on the picked-up articles at a second location as mentioned earlier.

Generally, the support movement mechanism includes a plurality of pairs of support movers, preferably independently motion controlled, each pair adapted to movingly engage one of the support means through an engagement means.

Further, the engagement means includes a pair of engaging lugs, each connected to one of the pair of support movers, and adapted to engage one end of the support means such that a horizontal movement of the pair of support movers horizontally moves the support means connected there between.

Particularly, the plurality of support means includes a plurality of rails extending between the pair of closed loop tracks and in a direction generally parallel to the first conveying line and the second conveying line.

Possibly, each of the gripper set includes one or more individual gripping heads arranged in a predetermined configuration movingly supported onto the corresponding support means.

Optionally, each of the gripper sets is longitudinally movable onto the corresponding support means through a gripper movement mechanism between a first end connected to a first conveying track and a second end connected to a second conveying track. The gripper movement mechanism is preferably independently motion controlled.

Further optionally, the gripper movement mechanism includes a plurality of gripping movers movingly configured onto each of the plurality of support means and adapted to engage one of the gripping heads therewith.

Optionally, one or more of the support means may support an article treatment device different from the gripper sets. For example, gripper sets may be alternated with a set of printing heads, a set of gluing heads, or any other functional element for performing an action onto a set of articles.

Yet further optionally, each of the longitudinally movable gripper-sets of the plurality of gripper sets has an independently varyingly adjustable pitch there between.

Moreover, the variably adjustable pitch of each of the gripper sets is determined on the basis of one or more factors selected from but not limited to difference in speed of conveying lines, difference between pitch of packages, arrangement of beverage containers, and the like.

In an embodiment, the gripper sets may be adapted to pick up the set of articles from a first conveying line and adapted to treat already picked up articles at a second conveying line.

In a preferred embodiment, the apparatus is adapted such that in operation the horizontal and/or circular movement of the plurality of support means across the pair of closed loop conveying tracks and the vertical movement of one or more pairs of the modular track portions are synchronized in such a way that at least one of the gripper sets is adapted to pick up a set of articles from the first conveying line, while at least one or more other gripper sets is adapted to drop a set of already picked up articles in a package at the second conveying line simultaneously.

Possibly, the article picking and treating apparatus includes a first powering means for powering the pair of closed loop conveying tracks selected from one or more of but not limited to linear motors (or equivalent independent mover transportation device), servo motors and synchronic and/or asynchronic motor drives.

Further possibly, the article picking and treating apparatus includes a second powering means for enabling, preferably independently, motion controlled, movement of each of the plurality of movers including the support movers and the treatment set movers wherein further the second powering means is selected from one or more of but not limited to linear motors (or any type of independent motion controlled mover transportation device), servo motors and synchronic and/or asynchronic motor drives.

In an embodiment of the present invention, the support means and/or gripper sets and/or the gripping heads may be wirelessly powered, for example via sliding contacts on the support movers and gripping movers, or preferably contactless powered, for example by providing inductive power to the support movers and gripping movers. Further, the vertically moveable track portions and/or the support means, and/or the gripper sets and/or the gripping heads may be wirelessly controlled, including but not limited to short range wireless, such as Bluetooth, Infrared, Microwave, Narrow through Broad Band Telecommunications, WLAN, WAN, or Internet protocols and the like, preferably in combination with wirelessly powering. Fast, deterministic wireless automation and control and wireless power supplies to realize synchronized, highly flexible, large range picking, treating and dropping operations, even while the articles are in transit.

Preferably, the first conveying line is an output line of an article manufacturing unit, optionally but not necessarily, having one or more means for grouping and/or arranging the articles in the predetermined configuration, whereas the second conveying line is an output of a package forming unit.

Possibly, the package is an already formed top open box having one or more side flaps for facilitating a closure thereof.

Further possibly, the package may be formed of a foldable blank of a material selected from one or more of, but not limited to, carton or corrugated paperboard, thermoplastic, hybrid material, laminated board and the like.

Optionally, the article picking and treating apparatus further includes a guiding unit adapted to keep the packages in an open state during the release of already picked up articles therein.

Possibly, the article picking and treating apparatus further includes a control unit adapted for synchronizing the horizontal and/or circular movement of the plurality of support means across the pair of closed loop conveying tracks and the vertical movement of one or more pairs of the modular track portions in such a way that at least one of the gripper sets is adapted to pick up the set of articles from the first conveying line, while at least one other gripper set is adapted to drop a set of already picked up articles in a package at the second conveying line simultaneously. Said control unit may further be adapted for synchronizing and optimizing the movement of each of the conveying tracks, the support movers, the gripping movers, the gripping heads, in accordance to a desired pick-up and/or drop operation either continuously and/or intermittently.

Further possibly, the control unit includes one or more sensors, one or more input units, a processor unit and an output unit.

In a preferred embodiment in accordance with the present invention, a method of packaging a set of articles is disclosed. The method includes receiving a continuous and/or intermittent supply of articles at the first conveying line. The method further includes grouping the articles at the first conveying line in a predetermine configuration and/or arrangement. Furthermore, the method includes receiving a continuous and/or intermittent supply of packages at the second conveying line. The method furthermore includes synchronizing a horizontal and/or circular movement of the plurality of support means across the pair of closed loop conveying tracks and a vertical movement of one or more pairs of the modular track portions in such a way that each of the gripper sets is facilitated to selectively pick up a set of articles from the first conveying line and/or to selectively release already picked up articles into one of the packages at the second conveying line.

Furthermore, the method includes optimizing the longitudinal movement of the gripper sets onto the corresponding means in accordance to a predetermined configuration of the set of articles to be packed.

Optionally, the method includes orienting the set of articles before releasing them within the package at the second conveying line.

Optionally, in another aspect of the present invention, a stand-alone guiding unit may be provided as described throughout this text.

Other aspects, features and advantages of the subject matter disclosed herein will be apparent from the description, the drawings, and the claims.

DETAILED DESCRIPTION

Figure 1:
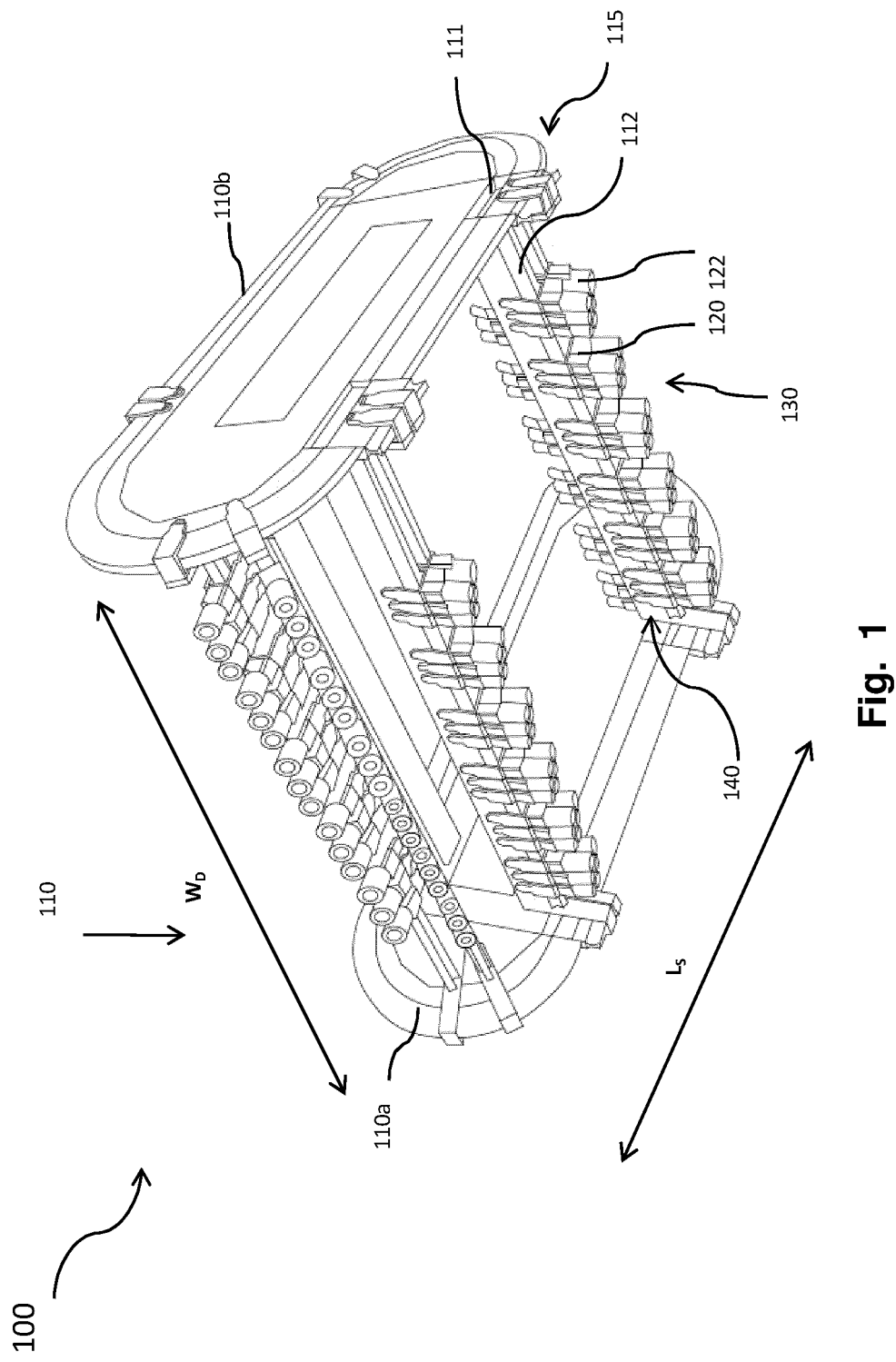
FIG. 1 illustrates a schematic diagram representing an article picking and treating apparatus, in accordance with the present invention.

As illustrated in FIG. 1, the present invention provides an article picking and treating apparatus 100 for picking and treating a set of articles (not shown) received at a first location, while treating an already picked up set of articles at a second location. The article picking and treating apparatus 100 includes a pair of generally parallel closed loop conveying tracks 110 having one or more pairs of vertically movable modular track portions 111. The article picking and treating apparatus 100 further includes a plurality of support means 112, each extending between and movably connected to the pair of closed loop tracks 110, in a longitudinal direction $L_S$ generally parallel to the generally parallel closed loop conveying tracks 110. The article picking and treating apparatus 100 further includes a vertical movement mechanism 115 for moving each of the pair of the modular track portions 111 in a vertically upward and/or downward direction and a support movement mechanism 130 adapted to circularly move each of the support means 112 in a generally widthwise direction $W_D$, across the pair of conveying tracks 110.

The article picking and treating apparatus 100 furthermore includes a plurality of gripper sets 120 movingly supported onto each of the support means 112. Each of the gripper sets 120 include one or more individual gripping heads 122 arranged in a predetermined configuration and movingly supported for independent motion controlled operation onto the support means 112 through a gripper movement mechanism 140. Each of the gripper sets 120 is adapted to perform an operation selected from pickup and treating a predetermined set of articles to be packed by the article picking and treating apparatus 100. In operation, the circular movement of the plurality of support means 112, including the longitudinal movement of the plurality of gripper sets 120 supported thereon, and the vertical movement of the pair modular track portions 111 is synchronized in such a way that one or more gripper sets 120 is adapted to selectively, statically or dynamically pick up a set of articles from a first location while one or more of the gripper sets selectively, statically or dynamically treat a set of already picked articles at a second location. Preferably, the first and second locations are a first and second conveying line in parallel. In that case, the apparatus enables transferring and treating articles in a direction transversal to the conveying lines while these lines are moving in continuous operation.

Figure 2:
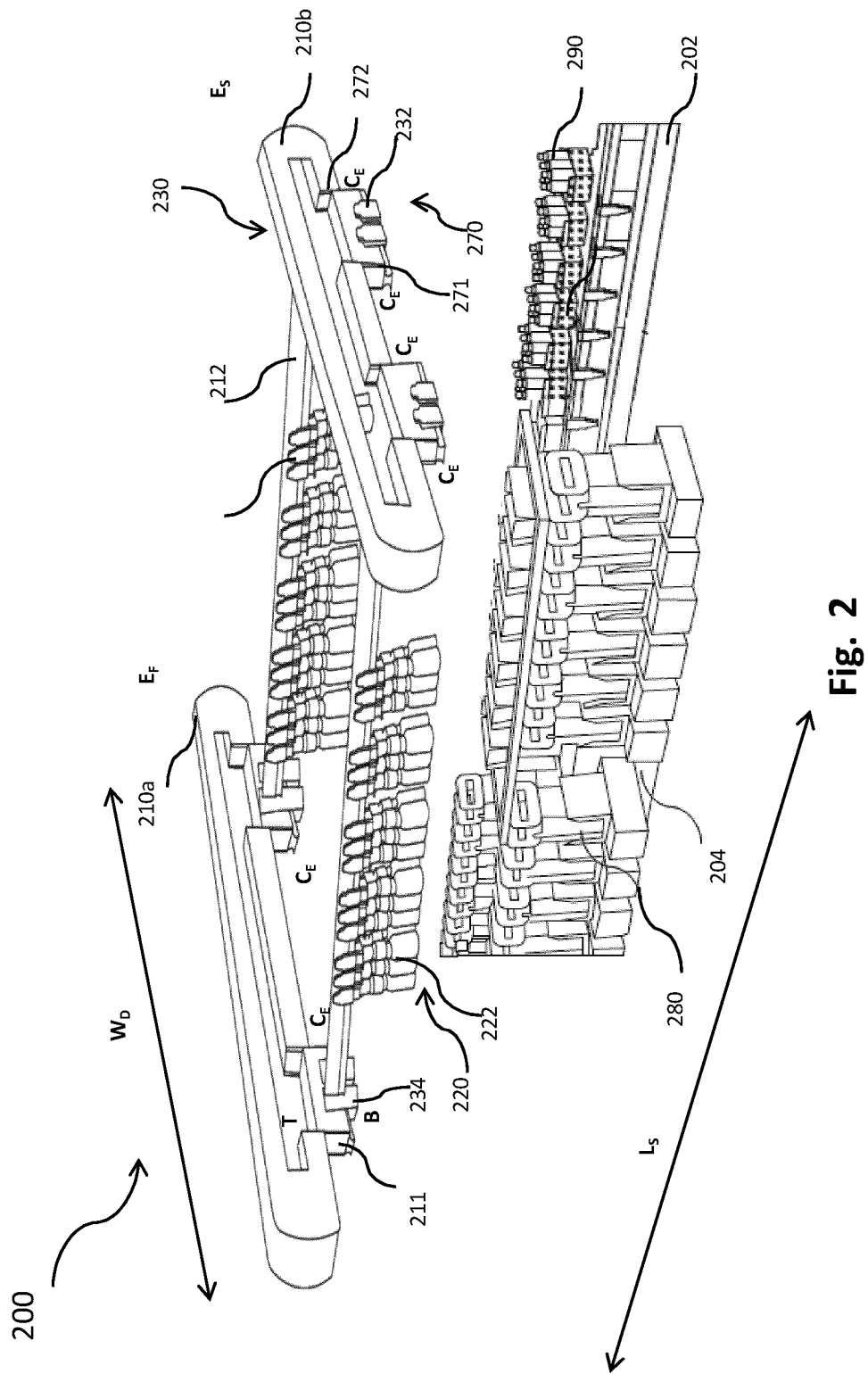
FIG. 2 illustrates a schematic diagram representing an exemplary article picking and treating apparatus configured between a first conveying line and a second conveying line and adapted for packaging articles, in accordance with a specific embodiment of the present invention.
Figure 3:
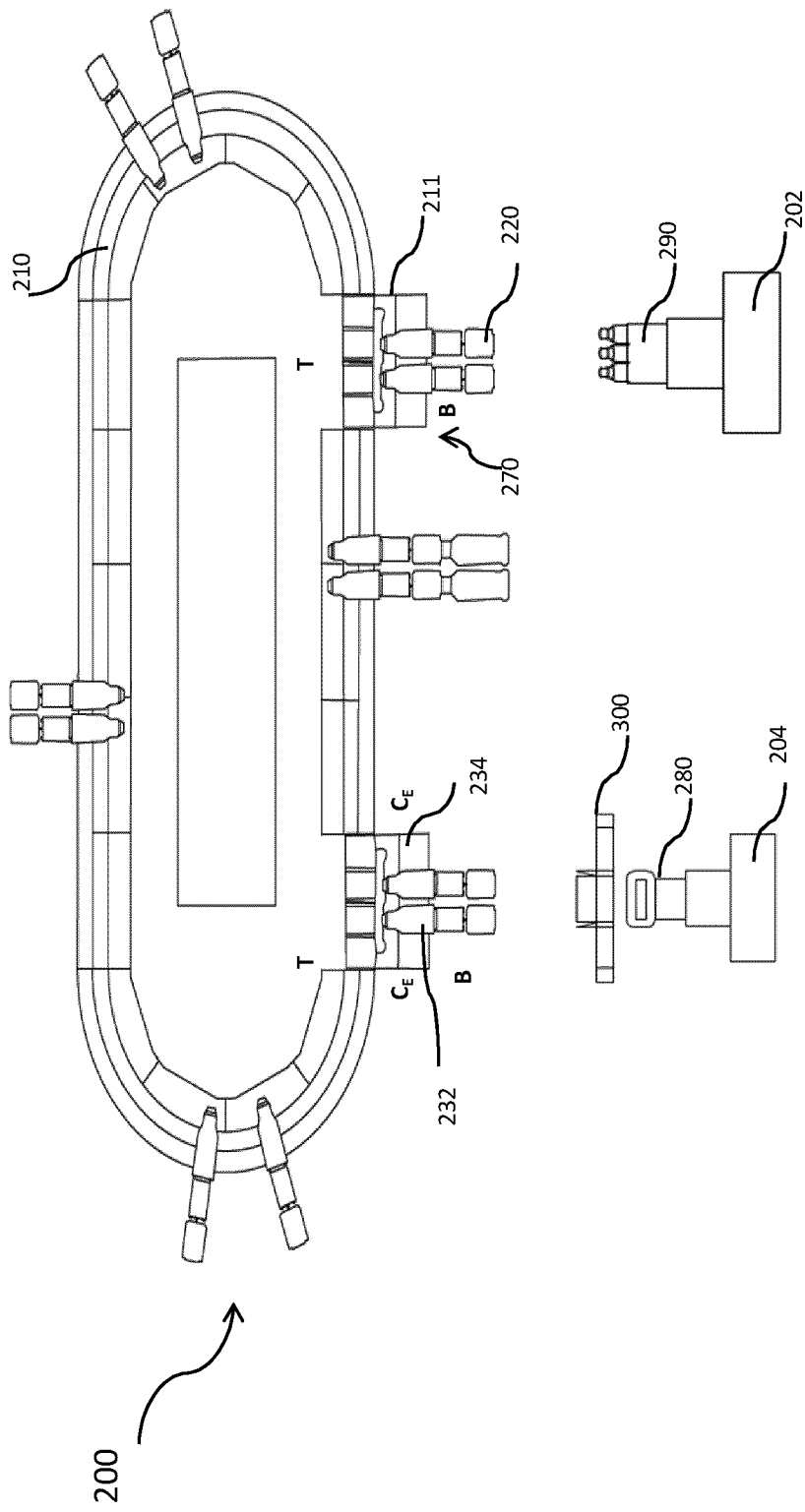
FIG. 3 illustrates a front view diagram representing the exemplary article picking and treating apparatus configured between the first conveying line and the second conveying line, in accordance with an embodiment of the present invention.

In description of the FIG. 2 that follow, elements common to the schematic system will have the same number designation unless otherwise noted. FIGS. 2 and 3, illustrates an exemplary article picking and treating apparatus 200 employed to pack a supply of beverage containers 290 statically or dynamically received at a first conveying line 202 statically or dynamically into a supply of packages received at the second conveying line 204 or onto the base panels of packaging material blanks still to be erected at the secondary conveying line 204. Optionally, the article picking and treating apparatus is adapted to intermittently pick up one or more already filled beverage containers 290 from the first conveying line 202 and release the same within one or more packages 280 at the second conveying line 204 carrying a feed of a plurality of already formed top and/or side opened packages 280.

In a preferred embodiment, the plurality of beverage containers 290 received at the first conveying line 202 is optionally and not essentially formed into groups in accordance to a desired predetermined arrangement. However, in other embodiments, the article picking and treating apparatus 200 may include a grouping means (not shown) adapted to group the supply of beverage containers within the desired predetermined arrangement. The system being capable of statically or dynamically picking articles from the first conveying line and performing collating, grouping, pitching and either static or dynamic delivery of the desired row/column article formats onto or into packaging at the second conveying line. The grouping means in such instance may include any suitable grouping mechanism already known in the art, for grouping and arranging the beverage containers at an out-feed of a conveying line.

The article picking and treating apparatus 200 includes a pair of independent motion controlled closed loop conveying tracks 210, including a first track 210a and a second track 210b, both generally in the form of circular tracks extending generally perpendicular to the first conveying line 202 and the second conveying line 204. The pair of closed loop conveyors 210 includes one or more pairs of vertically movable modular track portions 211 adapted to move vertically upward and/or downward through a vertical movement mechanism 270.

In an embodiment, the vertical movement mechanism 270 includes a pair of outer rails 271, one positioned along each of the connecting end $C_E$ of the modular track portions 211 with the corresponding conveying track 210. The vertical movement mechanism 270 further includes a rail receiving slot 272 configured on each of the circular tracks 210 at one or more points of contact C with the corresponding connecting end $C_E$ of the pair of modular track portions 211. Each of the receiving slots 272 is configured to movingly receive the corresponding outer rails 271 such that the pair of outer rails 271 is adapted to move vertically upwards and downward through the rail receiving slot so as to facilitate an upward and/or downward movement to the corresponding pair of modular track portions 211 between a top position T and a bottom position B thereof.

However, in other embodiments, the vertical movement mechanism 270 may include any suitable and conventionally known vertical movement mechanism that may be utilized for the selective movement of each of the pair of modular track portions 211 between the top position T and the bottom position B.

As illustrated in FIG. 2, the article picking and treating apparatus 200 further includes a plurality of independent motion controlled support means 212 extending transversally between the pair of conveying tracks 210a, 210b, and in a direction generally parallel to the first conveying line 202 and the second conveying line 204. Each of the plurality of support means 212 is movingly connected to the pair of tracks 210 at each of its end through an independent motion controlled support movement mechanism 230.

Figure 4A:
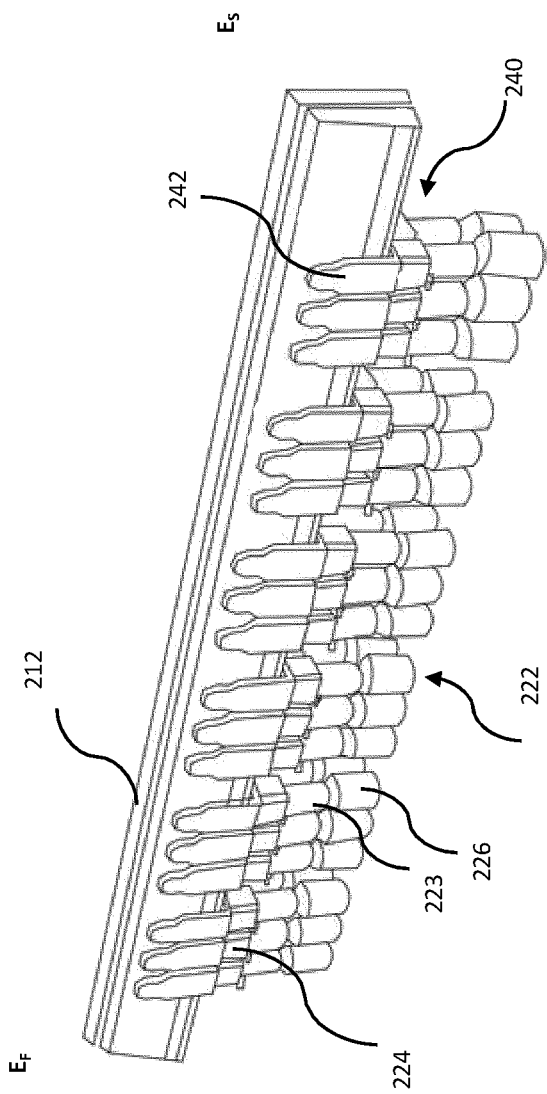
FIG. 4*a* illustrates an exemplary support means with gripper set, in accordance with a preferred embodiment of the present invention.
Figure 4B:
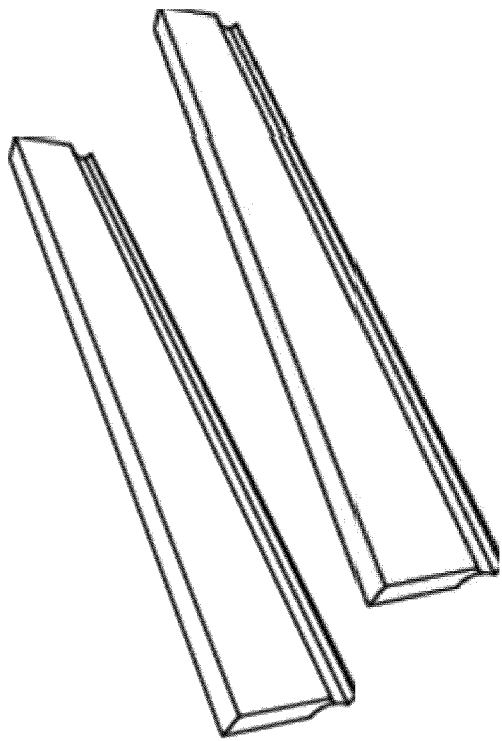
FIG. 4*b* illustrates an exemplary support rail, in accordance with a preferred embodiment of the present invention.
Figure 4B:
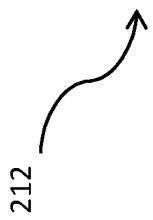

In an embodiment as illustrated in FIGS. 4a and 4b, the support means 212 may be in the form of a support rail 212, comprising a generally linear rail having a first end $E_F$ connected to the first track 210a and a second end $E_S$ connected to the second track 210b through the support movement mechanism 230 such that a longitudinal direction $L_S$ of each support means 212 is generally perpendicular to each of the conveying tracks 210a, 210b and extends there between to facilitate a connection between the tracks 210.

As disclosed earlier, the independent motion controlled support movement mechanism 230 is a movement mechanism generally adapted to move each of the support means 212 along the pair of conveying tracks 210. In a preferred embodiment, the support movement mechanism 230 includes a pair of independent motion controlled support movers 232, each configured at an opposite end of the supporting rail 212 through one or more engagement means 234. Further, each of the support movers 232 is movingly connected to one of the conveying tracks 210 such that independent motion controlled movement of the pair of support movers 232 allows the possibility of moving the corresponding support rail 212 in an independent motion controlled manner circularly about the pair of conveying tracks 210.

In an embodiment, the engagement means 234 includes a pair of engaging lugs, each connected to one of the pair of support movers 232, and adapted to engage the opposite ends of the support rail 212 such that each of the supporting rails 212 is movable towards and away from each other in a widthwise direction $W_D$ along the pair of circular tracks 210.

The article picking and treating apparatus 200 further includes a plurality of gripper sets 220 movingly supported and independently motion controlled onto the support means 212, adapted to perform pickup and/or release operations for the beverage containers 290 during the packaging thereof.

Figure 4C:
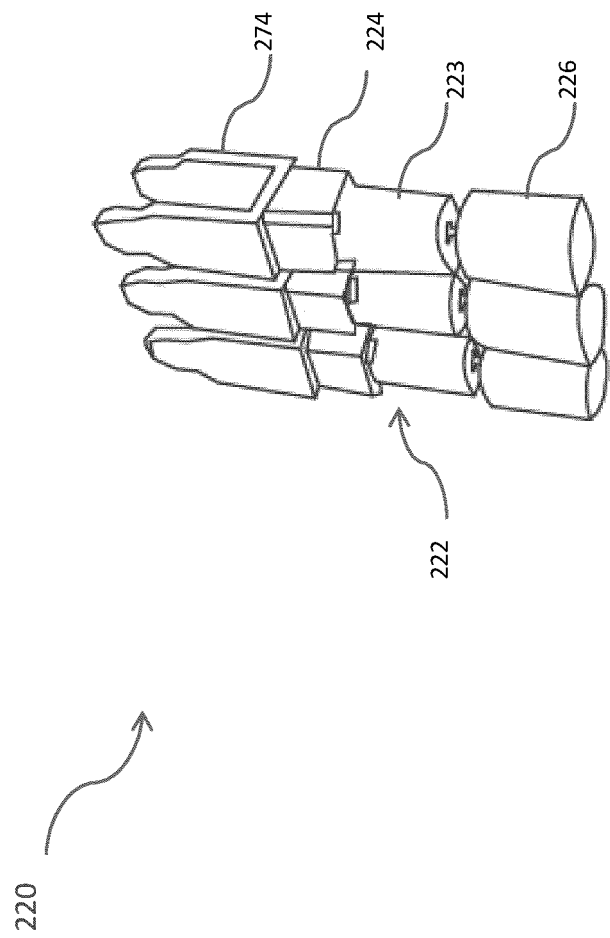
FIG. 4*c* illustrates an exemplary gripper set, in accordance with the preferred embodiment of the present invention.

The gripper set 220 includes a plurality of individual gripping heads 222 grouped together within a predetermined arrangement. The gripping head 222 is generally a bottle picker and/or releasing component. In a preferred embodiment, as illustrated in FIG. 4c, the gripping head 222 includes a gripper body 224 extending towards a downwardly protruding head 226 adapted to selectively perform an operation selected from pick up and/or release operations. The head 226 is of a shape and/or size and/or dimension complementary to the shape, size, or dimension of the article 290 and/or a contact portion thereof so as to enable the possibility of performing the pick-up and/or release operation.

The gripping head 222 may further include an orienting mechanism 223 adapted to rotate for example beverage containers picked therewith in a desired orientation, before dropping these onto the second conveying line 204. The container orienting mechanism 223 may be selected from one or more of, but not limited to, any suitable conventional rotating mechanism such as a rotational servo motor, and the like.

In other embodiments, the gripping head 222 may be selected from any conventionally mechanism known in the art and suitable for picking and/or releasing articles. Possibly, in the case of the articles being beverage containers, the gripping head may include a gripper body extending towards a downwardly protruding beverage container head adapted to selectively perform an operation selected from pick up and/or release operation. In such case, the gripping head may be an electric tulip gripper, optionally equipped with built-in sensors such as for example a closure sensor. The orientation mechanism may enable rotation up to 360°.

In a preferred embodiment, article rotation to spin or otherwise rotate the article may be realized via a motor mounted within and fully integrated with the body of the gripping mover, preferably with angular position sensing encoder. Further more, spin or rotation is powered and controlled by wireless, contactless inductive power supply/s and controlled also by the wireless machine automation. The system including appropriate wireless feedback sensing likewise via a two-way wireless machine automation and control system, powered by a slide power supply or contactless, wireless inductive power supply system/s, all of which enable untethered freedom of far ranging yet controlled motion and operation. The motor may be a stepper, permanent magnet, servo motor or the like suitably powerful and controllable for the duty and small enough to fit.

In a preferred embodiment, the gripping head is an electrically activated tulip optionally complete with container presence and container closure presence sensing along with optional solenoid activation sensing. The electric tulip is realized via the said wireless machine control and either the slide power supply or contactless, wireless power supply, all of which enable untethered freedom of far ranging yet controlled motion and operation.

In a preferred embodiment, each of the gripping heads 222 is individually independently motion controlled movable along the support rail 212 between the first end $E_F$ and the second end $E_S$, using one or more gripper movement mechanisms 240 (FIG. 4a). In some instances, the gripper movement mechanism 240 includes a plurality of grippers movers 242 movingly configured onto each of the support rails 212 such that each of the movers 242 is adapted to movingly engage in an independently motion controlled manner one of the gripping heads 222 therewith. Accordingly, in such embodiments, the predetermined arrangement of the gripping heads 222 within each of the gripper sets 220 may be changed dynamically by independent motion controlled relative movement between the support rails 212 in the widthwise direction $W_D$ and independent motion controlled movement of the gripping heads 222 in the longitudinal direction $L_S$ thereof.

Alternatively, in some embodiments, each of the gripping head 222 is stationary to the corresponding gripper set 220, which in turn is itself movable along the support rail 212 between the first end $E_F$ and the second end $E_S$ using the one or more gripper movement mechanism 240. In such instances, the gripper movement mechanism 240 includes a plurality of treatment set movers 242 movingly configured onto each of the support rails 212 such that each of the movers 242 is adapted to movingly engage one of the gripper sets 220 therewith. Further in such embodiments, the predetermined arrangement of the gripping heads 222 within each of the gripper sets 220 may be changed dynamically only in a widthwise direction by moving the rails 212 towards and/or away from each other.

Figure 5A:
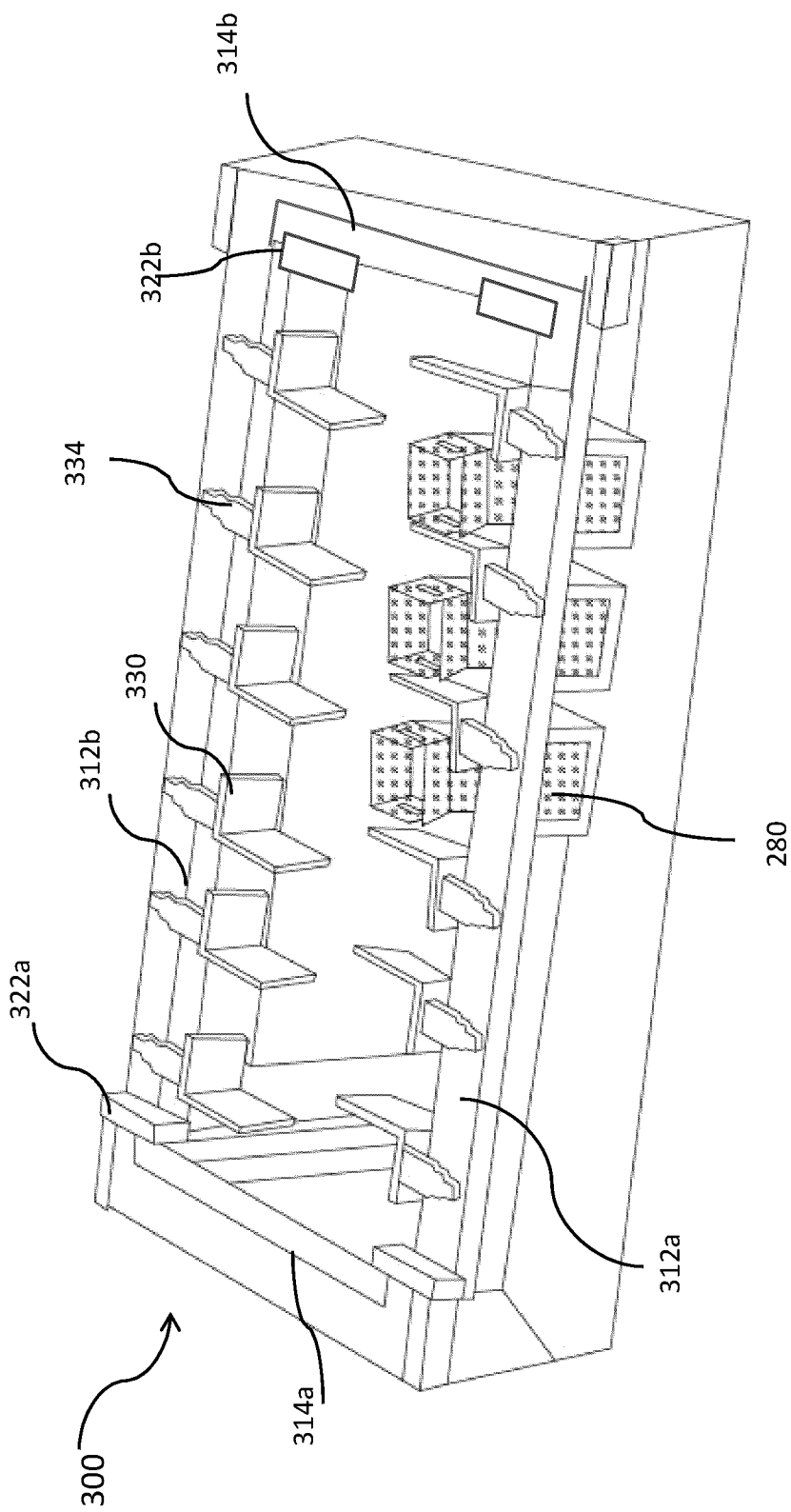
FIG. 5*a*, 5*b*, 5*c* illustrates an exemplary guiding unit, in accordance with the preferred embodiment of the present invention.
Figure 5B:
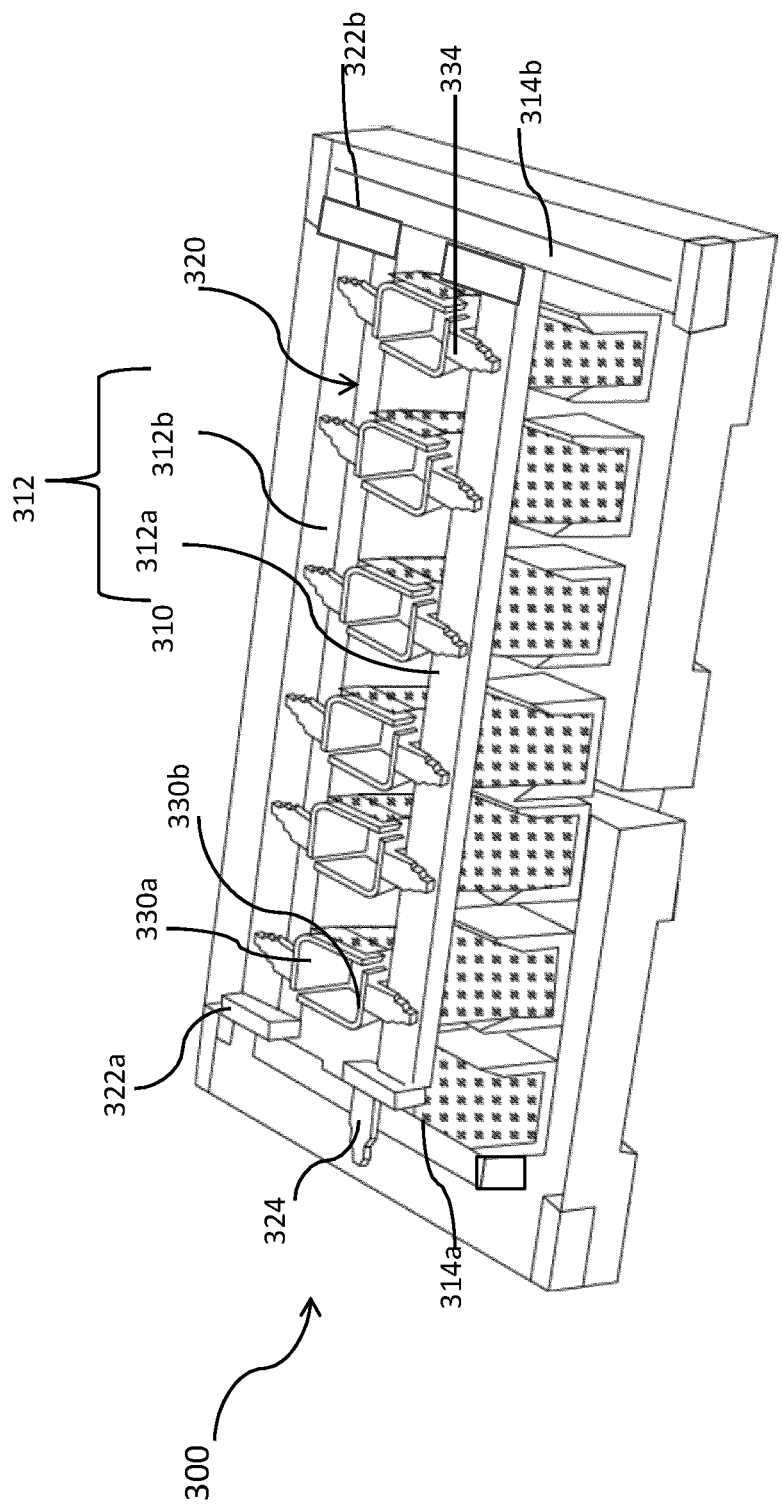
Figure 5C:
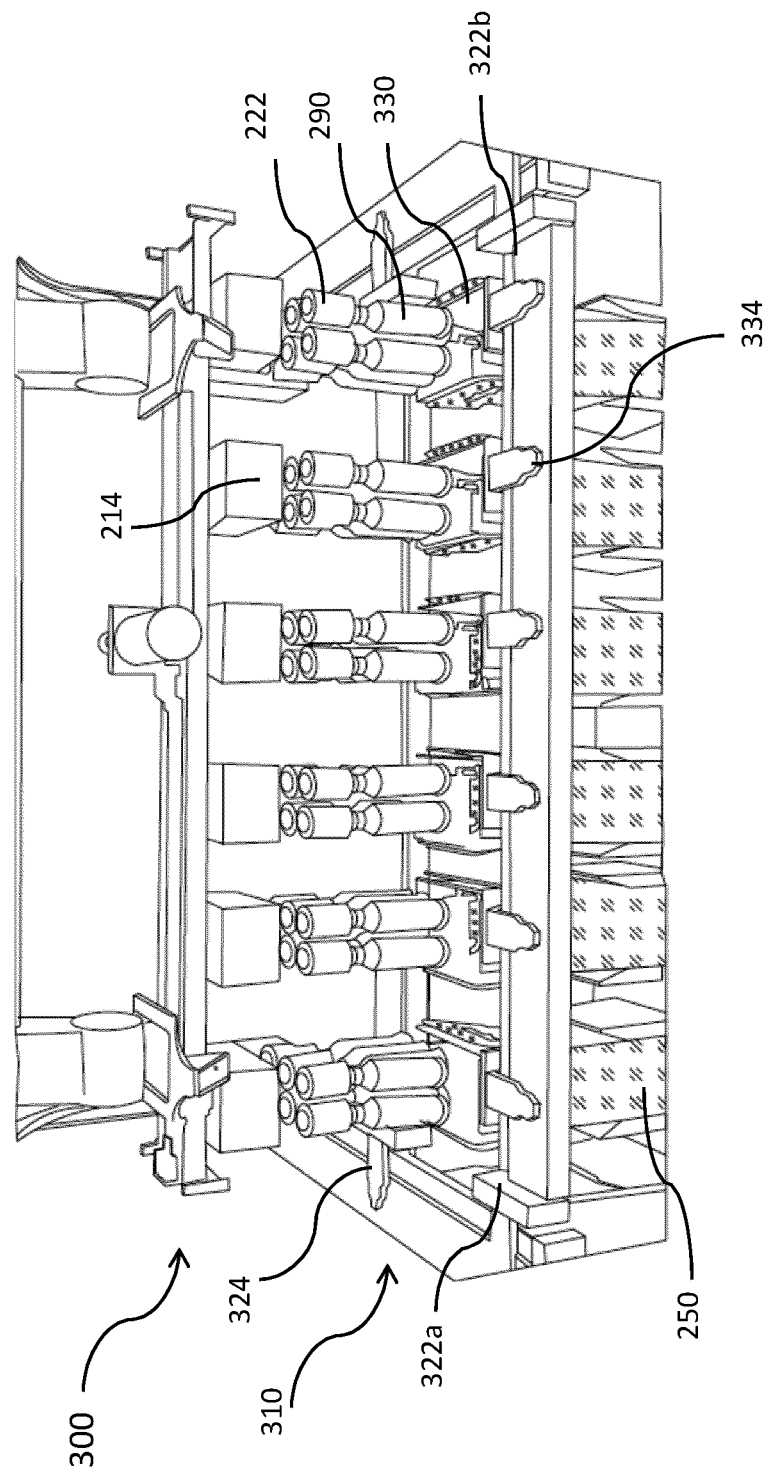
Figure 5D:
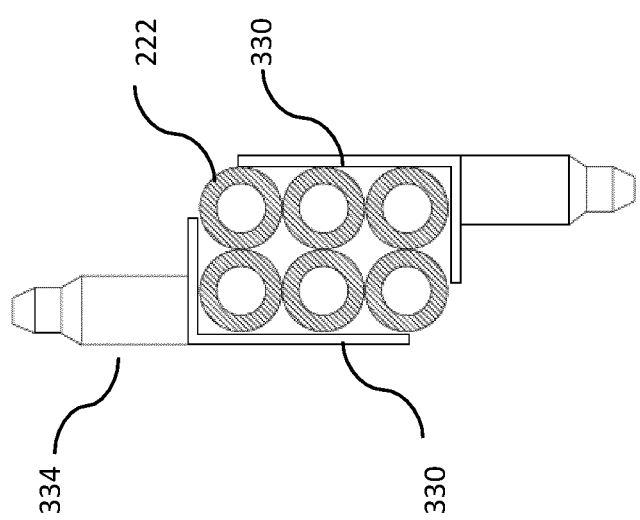
FIG. 5*d* illustrates an exemplary pair of guiding means of the guiding unit, in accordance with the preferred embodiment of the present invention.

In an embodiment of the present invention, as illustrated in FIGS. 5a, 5b, 5c, the article picking and treating apparatus 200 further includes a guiding unit 300 for facilitating the release of the already picked articles 290 within the package 280 such that closure of the package 280 is avoided during the article release operation. Further, such guiding unit 300 is adapted to guide the release of the containers 290 in the package 280 with a funnel effect, so as to avoid any contact between the containers 290 and sidewalls 282 of the package 280 such that any damage and/or scratch to the package 280 and/or articles 290 during the release operation is avoided. The guiding unit includes 300 an overhead frame 310 (FIG. 5c) formed of at least two spaced apart generally parallel longitudinal rails 312 including a first longitudinal rail 312a, and a second longitudinal rail 312b connecting and extending between two or more spaced apart generally parallel transverse rails 314 including a first transverse rail 314a, and a second transverse rail 314b. Each of the longitudinal rails 312a, and 312b is movable in a horizontal direction towards and away from each other using one or more guiding rail movement mechanism 320.

The guiding rail movement mechanism 320 is generally a mechanism allowing the possibility of movement of longitudinal rails 312 of the overhead frame 310 along the transverse rails 314. In a preferred embodiment, the guiding rail movement mechanism 320 includes one or more pairs of connecting members 322 comprising a first connecting member 322a, and a second connecting member 322b, each pair of the connecting members 322 adapted to engage one of the longitudinal rails 312 at its opposite end.

Further, the guiding rail movement mechanism 320 includes a plurality of rail movers 324 movingly connected to the transverse rails 314. Each of the rail movers 324 is adapted to movingly engage one of the connecting members 322 such that a horizontal movement of each of the pair of connecting member 322 along the corresponding transverse rails 314 is made possible thereby enabling a movement of longitudinal rails 312 in a direction towards and away from each other.

The guiding unit 300 further includes one or more pairs of parallel guiding means 330, including a first guiding means 330a, and a second guiding means 330b (FIG. 5b) movably connected to the parallel longitudinal rails 312a and 312b through a plurality of guiding movers 334. Each of the pairs of guiding means 330 is adapted to be received in the package 280 such that each of the guiding means 330a, 330b conforms to at least one inner side wall (which may be a corner) of the package 280 such that when in contact with the side wall it avoids a closure of a side-flap extended from the said side wall.

The apparatus 200 further includes a first powering means (not shown) for enabling a movement of the pair of conveying tracks 210, the overhead frame 310, the first conveying line 202, the second conveying line 204, the grouping means (not shown) and various sub-components thereof. the said first powering means may be a linear servo motor facilitating a continuous operation of each of the components of the article picking and treating apparatus 200. However, in other embodiments, the first powering means is a linear servo motor facilitating an intermittent operation of each of the components of the article picking and treating apparatus 200.

The article picking and treating apparatus 200 further includes a second powering means (not shown) for enabling a movement of each of the movers including, the support movers 232, the treatment set movers 242, the rail movers 324, and the guiding movers 334 along the corresponding tracks and/or rails. the said second powering means may be a linear servo motor such as e.g. of a generally moving magnet type of motor conventionally known in the art.

In other embodiments, the movers 232, 242, 324, 334 are utilized as stators whereas the tracks or rails are utilized as the rotors. In such an embodiment, each of the movers 232, 242, 324, 334 include built in coils and each of the corresponding tracks or rails include a plurality of magnets configured thereon in a longitudinal direction such that the movers are able to come into an electromagnetic interaction, thereby enabling their movement.

The article picking and treating apparatus 200 may further include one or more control units (not shown) for managing the operations thereof, and particularly for managing the working of the first and second powering means and thus the movement of the support movers 232 and the treatment set movers 242, in a predetermined sequence, so as to optimize the grouping of the gripper heads 222 in accordance to a desired predetermined arrangement of articles 290 in a package 280.

In some embodiments, the control unit may include an input unit for receiving the predetermined arrangement of articles 290 to be formed and received within the package 280. Further, the control unit may include a plurality of sensors for tracking the parameters such as for example, position of the package 280, arrangement of articles 290, and the like. The control unit may further include a processor unit for processing the data captured by the input unit on the basis of predetermined logics and rules for facilitating the movement of the components of the article picking and treating apparatus 200. The control unit may further include an instruction unit that delivers the instructions to various components such as various powering means, linear motors, motors, driving units, or the like, to facilitate a desired and smooth operation.

In some embodiments, the control unit may be provided as a computer program product, such as may include a computer-readable storage medium or a non-transitory machine-readable medium maintaining instructions interpretable by a computer or other electronic device, such as to perform one or more processes.

FIG. 2 schematically show the arrangement of the basic components of the article picking and treating apparatus 200 of the present invention. However, in the construction of commercial functional units, secondary components such as couplers, connectors, support structures and other functional components known to one of skill in the field of article picking and treating apparatuses and more particularly the article picking and treating apparatus for secondary package for use with conveyor systems, may be incorporated within the article picking and treating apparatus 200. Such commercial arrangements are included in the present invention as long as the structural components and arrangements disclosed herein are present. Accordingly, it is to be contemplated that the article picking and treating apparatus 200 may be configured to be used for any kind of secondary packages of any possible shape as deems possible without deviating from the scope of the current invention.

Further, within the preferred embodiment, the secondary package 280 may be formed from a recyclable material selected from one or more of, but not limited to, any desired material such as including all kind of papers, fiberboard, corrugated board, hybrid material, or any combinations thereof. In some other embodiments, the secondary package 280 may be made of a light-weight plastic material selected from one or more of but not limited to plastic material such as group of thermoplastics including acetal, acrylic, cellulose acetate, polyethylene, polystyrene, vinyl, and nylon.

Further, the shape and size, including the height of the package 280 may be varied depending on the design constraints and requirements for its application. For example, within the instances when the package 280 is adapted to house twelve containers in one layer in a 3×4 arrangement the carton is dimension accordingly. Further, in other instances, the carton may be sized and shaped to hold containers of a different or same quantity in a single layer, more than two layers, and/or in different row/column arrangements (e.g., 1×6, 3×6, 2×6, 4×6, 2×3×4, 2×6×2, 2×9, 3×5, 3×5×2, etc.). Further, in yet other instances, the packages 280 may be formed in various possible symmetrical as well as asymmetrical shapes.

In a preferred embodiment of the present invention, each of the conveying tracks 210 of the article picking and treating apparatus 200 including the pair of conveying circular tracks 210, the first conveying line 202, and the second conveying line 204 may be generally vertically or horizontally positioned independently motion controlled circular tracks conventionally known in the art. In yet other embodiments of the present invention, each of the conveying tracks 210 of the article picking and treating apparatus 200 including the pair of conveying circular track 210, the first conveying line 202, and the second conveying line 204 may be configured as virtual independently motion controlled closed loop conveyors.

As known in the art, the virtual closed loop conveyor is generally a closed loop conveyor similar to a circular conveyor, in which the circular connecting edges of the conveyors on both the ends are replaced by a straight shiftable conveyor portions adapted to move back and forth and avoiding the need of moving the movers through the entire circumference of the circular track, and is therefore a fast, more powerful and cost efficient alternative to the conventionally known closed loop conveying tracks incorporating clothoids or equal radii curve or bend segments.

It is to be contemplated that an article, as used within the present invention, may be any kind of article such as including all possible food items, house-hold items, stationary items, and others, and manufactured, distributed etc. in all possible industries.

Optionally, in case of a packaging operation according to FIG. 2, the step of releasing the set of already picked up articles 290 includes an additional step of using the guiding means 300 for avoiding the closure of the secondary package 280 during the release operation of the gripper set 220. Such an action is performed by first moving the guiding unit 300 over the second conveying line 204 where a feed of top opened secondary packages 280 is received in such a way that at least one of the pair of guiding means 330, is received within a secondary package 280 and adapted to conform to inner sidewalls thereof, thereby avoiding the possibility of closure thereof. Further, such guiding unit 300 avoids any damage to the sidewalls 282 of the package 280 and the articles 290 during the dropping operation. In a preferred embodiment of the present invention, a pair of guiding means 234, may have a generally L shape, adapted to support two adjacent walls of the secondary package 280. However, in other embodiments, any number of pairs of guiding means 330, may be used in accordance to the shape of the package 280.

The invention claimed is:

1. An apparatus for picking and treating articles comprising:
   a pair of parallel closed loop conveying tracks having one or more pairs of vertically movable modular track portions, each pair of said vertically moveable modular track portions including a first modular track portion being part of a first track of said pair of closed loop conveying tracks and a second modular track portion being part of the second track of said pair of closed loop conveying tracks;
   a plurality of support means configured transversally to the pair of closed loop conveying tracks, each support means extending between and connected to the pair of conveying tracks at its opposite ends through a support moving mechanism;
   a plurality of gripper sets movingly configured onto one or more of the support means;
   wherein said apparatus is adapted such that in operation a horizontal movement of the plurality of support means across the pair of circular tracks and a vertically upward and/or downward movement of the one or more pairs of modular track portions are synchronized in such a way that one or more of the gripper sets of one of the support means is adapted to selectively pick up a set of articles from a first location while one or more of the gripper sets of another support means selectively treat a set of already picked articles at a second location.

2. The apparatus of claim 1, having two pairs of vertically moveably modular track portions, and adapted such that in operation, when a first support means supporting one or more gripper sets is located on a first pair of vertically moveable modular track portions and a second support means is located on the second pair, upward and/or downward movement of the two pairs of track portions is performed in order to selectively pick up a set of articles from a first location while one or more of the gripper sets of the second support means selectively treats a set of already picked articles at a second location.

3. The apparatus of claim 1, wherein the support means is a support rail adapted to movingly support the plurality of gripper sets.

4. The apparatus of claim 3, wherein each of the gripper sets is longitudinally movable onto the corresponding support means through a gripper movement mechanism.

5. The apparatus of claim 1, wherein each of the gripper sets comprising one or more of individual gripping heads arranged in a predetermined configuration, each gripping head adapted to pick up an article from a first conveying line.

6. The apparatus of claim 1, wherein the support movement mechanism comprises a plurality of pair of support movers movingly configured onto the pair of conveying tracks, each of the pair of support movers adapted to movingly engage one of the support means through an engagement means.

7. The apparatus of claim 6, wherein the engagement means comprises a pair of engaging lugs each connected to the one of the pair of support movers and adapted to engage one end of the support means such that a horizontal movement of the pair of support movers horizontally moves the support means connected there between.

8. The apparatus of claim 6, further comprising a first powering means for powering the pair of closed loop conveying tracks and a second powering means for enabling a movement of each of a plurality of movers including the support movers and the gripper sets, wherein the first and second powering means are selected from one or more of, but not limited to, linear motors, servo motors and synchronic and/or asynchronic motor drives.

9. The apparatus of claim 8, further comprising a control unit for optimizing a movement of each of the conveying tracks, the support movers, the gripper sets, and gripping heads of the gripper sets, in accordance to a desired pick-up and/or a drop operation either continuously and/or intermittently.

10. The apparatus of claim 9, wherein the support means and/or the gripper sets and/or the gripping heads are wirelessly powered and/or wirelessly controlled.

11. The apparatus of claim 1, wherein at least one of the gripper sets is adapted to pick up the set of articles from a first conveying line, and at least one another gripper sets is adapted to drop an already picked up set of articles simultaneously and at the same time in a package at a second conveying line.

12. The apparatus of claim 11, wherein each of the gripper sets is adapted to orient the picked-up articles before dropping into the package at the second conveying line.

13. The apparatus of claim 11, wherein the first conveying line comprises one or more means for grouping and arranging the articles in a predetermined configuration.

14. The apparatus of claim 11, wherein the second conveying line comprises an output of a carton forming unit carrying a supply of cartons to be packaged with articles.

15. The apparatus of claim 1, wherein one or more of the support means supports an article treatment device different from the gripper sets.

\* \* \* \* \*